United States Patent
Biran

(10) Patent No.: US 6,345,347 B1
(45) Date of Patent: Feb. 5, 2002

(54) ADDRESS PROTECTION USING A HARDWARE-DEFINED APPLICATION KEY

(75) Inventor: Giora Biran, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/406,527

(22) Filed: Sep. 27, 1999

(51) Int. Cl.$^7$ .............................................. G06F 12/00
(52) U.S. Cl. ..................................................... 711/163
(58) Field of Search ................................ 711/163, 164, 711/154

(56) References Cited

U.S. PATENT DOCUMENTS

| | | | | |
|---|---|---|---|---|
| 5,797,030 A | * | 8/1998 | Hoaby | 395/827 |
| 5,802,590 A | * | 9/1998 | Draves | 711/164 |
| 6,192,455 B1 | * | 2/2001 | Bogin et al. | 711/154 |

OTHER PUBLICATIONS

"Virtual Interface Architecture" specification version 1.0 published by Compaq Computer Corporation et al., Dec. 16, 1997.

* cited by examiner

Primary Examiner—Matthew Kim
Assistant Examiner—Christian P. Chase
(74) Attorney, Agent, or Firm—Darby & Darby

(57) ABSTRACT

In a computer system in which a software application accesses a system memory by communicating directly with a hardware device, a method for protecting addresses in the memory from improper access. The method includes, in an initialization stage, assigning a register of the hardware device to the application and generating in the hardware device a protection block, which block is used thereafter by the device to control access by the application to the system memory. A first key is stored in the protection block corresponding to a physical address of the register, and a handle is assigned to the application that refers to the protection block. In operation of the application, a command is conveyed from the application via the register to access the system memory, the command including the handle. Responsive to the command, a second key is generated in the hardware device corresponding to the physical address of the register. Responsive to the handle, the first and second keys are compared, and the application is allowed to access the memory only if the keys match in a predetermined manner.

30 Claims, 4 Drawing Sheets

ADDRESS PROTECTION USING A HARDWARE-DEFINED APPLICATION KEY

FIELD OF THE INVENTION

The present invention relates generally to computer input/output adapters, and specifically to how such an adapter implements memory protection.

BACKGROUND OF THE INVENTION

FIG. 1 is a schematic diagram illustrating a method of communication in a computing system between a conventional software application 10 and a local network 11, using an input/output (I/O) adapter 16, as is known in the art. As is shown, one of the ways conventional software application 10 communicates with local network 11, as well as with other system elements, is by using a part of an operating system (OS) 12 termed a kernel 14. The kernel acts as an interface between application 10 and I/O adapter 16. For each I/O operation, kernel 14 makes, inter alia, data copies and context switches as required to access the I/O adapter.

In the communication method illustrated by FIG. 1, application 10 uses a kernel call when interfacing with I/O adapter 16. Operating system 12 acts as a trusted agent in translating the kernel call to a corresponding physical address used by the I/O adapter to access local network 11. In other words, the operating system is responsible for ensuring that the specific application, and only the specific application, is able to access the correct physical address, so ensuring that conflicts are avoided.

As computing speeds have increased, the OS-based interface between application and I/O adapter has become a bottleneck, particularly for networked systems, and alternative, higher-speed architectures for interfacing between high-performance network hardware and a computing system have been suggested. One such alternative architecture is described in "Virtual Interface Architecture" (VIA) specification version 1.0, published by Compaq Computer Corporation et al., which is incorporated herein by reference.

FIG. 2 is a schematic illustration of such an alternative architecture. The architecture uses a more direct connection between software application 10 and I/O adapter 16 than that shown in FIG. 1, whereby the application interfaces with I/O adapter 16 without the mediation of the operating system. There is a dedicated address 24, or window, assigned in a memory of I/O adapter 16, termed a "doorbell," through which application 10 communicates with the I/O adapter. Other applications are assigned their own corresponding doorbells. Doorbells are mapped into different pages (typically 4 KB segments) of memory space in order to allow the operating system to maintain protection. In this higher-speed architecture, I/O adapter 16 translates a virtual address 22 provided by the application when it communicates via the doorbell into a physical address which is used to access a system memory 18. The I/O adapter handles the address protection that was previously performed by the operating system, by using a protection tag 20, as described in more detail below.

Appendix C of the VIA specification describes an example of a hardware model of a Virtual Interface Network Interface Controller (VI NIC), which performs the general function of I/O adapter 16 shown in FIG. 2. As explained in the appendix, the VI NIC copies data from system memory 18, inter alia, to a network medium in a transmit phase, and from the medium to memory in a receive phase. In order to perform its tasks of addressing the memory non-contentiously, the VI NIC generates a configurable translation and protection table (TPT) 26 of a given size. The table is used as a look-up table when the NIC translates from a virtual address 22 generated by an application to a corresponding physical address 28. The table comprises ordered pairs of physical memory addresses and a protection tag for each respective address. The tag is generated for each application by the operating system, and the tag is then used to ensure that the physical address is only accessible to a process using the protection tag of the address. Because the TPT has a fixed size, the tag generated may need to be truncated, depending on the number and size of the memory addresses, so that there is a finite chance that a second application will be able to access the physical address being protected.

SUMMARY OF THE INVENTION

It is an object of some aspects of the present invention to provide methods and apparatus for ensuring fully non-contentious addressing between a plurality of applications and a memory.

It is a further object of some aspects of the present invention to provide methods and apparatus for ensuring address protection using a hardware-defined key.

In some preferred embodiments of the present invention, a computer application running on a computer system communicates directly with an I/O hardware adapter in the system. During an initialization process for the application, operating system (OS) software which is running on the computer system assigns a register in the I/O adapter to the application. The register is dedicated to the application, and is protected by the operating system of the computer from access by other applications. Also during the initialization, a protection block, specific to the application, is constructed within a memory space of the I/O adapter used by the application. The protection block stores a number key corresponding to a physical address of the register. A data buffer in a memory of the computer system is allocated to the application, and at the end of the initialization process, a "handle" associated with the data buffer's address is created and returned by the OS to the application.

During operation of the application, the application writes commands via the dedicated register on the I/O adapter. Each such command includes a virtual address pointer to the data buffer, together with the handle. The handle is used by the I/O adapter as a pointer to the protection block specific to the application. The I/O adapter adds a key to the command, the key depending on the address of the register through which the command is written. The added key and the key in the protection block are compared, and if the keys match, the command is allowed to execute. If the keys do not match, command execution is denied. Further checks using parameters stored in the protection block are also made to ensure that the command is valid, and if all checks are passed, the I/O adapter translates the data pointer to the appropriate physical address, and the command executes.

The method of comparing two keys exactly, wherein the key corresponds uniquely to the appropriate hardware address, means that there is no possibility of conflicts occurring, unlike the system described in the Background of the Invention. Furthermore, since the key in the protection block is calculated directly from the physical address of the register in the I/O adapter, which is a hardware device, the method may be easily implemented in hardware with reduced processing overhead relative to alternative systems that have been suggested.

There is therefore provided, in accordance with a preferred embodiment of the present invention, a method for protecting addresses in a system memory from improper access in a computer system in which a software application accesses the system memory by communicating directly with a hardware device, including:

in an initialization stage:

assigning a register of the hardware device to the application;

generating in the hardware device a protection block, which block is used thereafter by the device to control access by the application to the system memory;

storing in the protection block a first key corresponding to a physical address of the register; and assigning a handle to the application that refers to the protection block; and in operation of the application:

conveying a command from the application via the register to access the system memory, the command including the handle;

responsive to the command, generating in the hardware device a second key corresponding to the physical address of the register;

responsive to the handle, comparing the first and second keys; and allowing the application to access the system memory only if the first and second keys match in a predetermined manner.

Preferably, the system memory includes memory accessed via a computer network.

Preferably, assigning the register includes assigning the register uniquely to the application, among other applications and registers in the system.

Preferably, storing the first key includes storing a key unique to the system.

Preferably, comparing the first and second keys includes checking one or more access permissions held in the protection block.

Preferably, allowing the application to access the system memory includes utilizing a translation table associating virtual addresses used by the application with physical addresses in the system memory. Further preferably, utilizing the translation table includes storing a pointer to the translation table in the protection block.

Preferably, allowing the application to access the system memory includes allowing access only if the first and second keys match exactly.

There is further provided, in accordance with a preferred embodiment of the present invention, a method for protecting addresses in a system memory from improper access in a computer system in which a software application accesses the system memory by communicating directly with a pre-assigned register of a hardware device, the register having a predetermined physical address in the system, the method including:

conveying a command from the application via the register to access the system memory;

responsive to the command, generating in the hardware device a command key corresponding to the physical address of the register;

comparing the command key to a stored access key previously assigned to the application; and allowing the application to access the system memory only if the keys match in a predetermined manner.

Preferably, the access key is stored in a protection block of the hardware device, and conveying the command includes conveying a handle assigned to the application that refers to the protection block.

Preferably, the stored access key corresponds to the physical address of the register.

Preferably, the system memory includes memory accessed via a computer network.

Preferably, the pre-assigned register is assigned uniquely to the application, among other applications and registers in the system.

Preferably, generating the command key includes generating a key unique to the system.

Preferably, comparing the command key and the stored access key includes checking one or more access permissions held in the protection block.

Preferably, allowing the application to access the system memory includes utilizing a translation table associating virtual addresses used by the application with physical addresses in the system memory.

Alternatively, utilizing the translation table includes storing a pointer to the translation table in the protection block.

Preferably, allowing the application to access the system memory includes allowing access only if the command and access keys match exactly.

There is further provided, in accordance with a preferred embodiment of the present invention, an input/output adapter for communicating directly with a software application running in a computer system so as to enable the application to access a system memory in the system while protecting addresses in the system memory from improper access, the adapter including:

a register having a physical address, which responsive to a command from the application to access the system memory generates a command key corresponding to the physical address of the register; and a protection block, which stores an access key assigned to the application, and which compares the command key and the access keys and enables the application to access the system memory only if the keys match in a predetermined manner.

Preferably, the protection block includes a handle which is used by the application to refer to the protection block.

Preferably, the system memory includes memory accessed via a computer network.

Preferably, the register is assigned uniquely to the application, among other applications and registers in the system.

Preferably, the command key includes a key unique to the system.

Preferably, the protection block holds one or more access permissions which are compared to enable the application to access the system memory.

Preferably, the protection block accesses a translation table associating virtual addresses used by the application with physical addresses in the system memory.

Alternatively, the protection block stores a pointer to the translation table.

Preferably, the application accesses the system memory only if the command and access keys match exactly.

There is further provided, in accordance with a preferred embodiment of the present invention, a computer program product for use in a computer system so as to enable a software application to access a system memory by communicating directly with a hardware device while protecting addresses in the system memory from improper access, the product preferably comprising a computer-readable medium having computer-readable program instructions embodied therein, which instructions, when executed by the computer system, cause the system to assign a register of the hardware device to the application, and to generate in the hardware device a protection block, which block is used thereafter by the device to control access by the application to the system memory, and to store in the protection block a first key corresponding to a physical address of the register and assign a handle to the application that refers to the protection block, so that in operation of the application, when a command including the handle is conveyed from the application via the register to access the system memory, a second key is generated in the hardware device responsive to the command, corresponding to the physical address of the register, and wherein responsive to the handle, the first and second keys are compared, and the application is allowed to access the system memory only if the keys match in a predetermined manner.

There is further provided, in accordance with a preferred embodiment of the present invention, a computer program product for use in a computer system in which a software application accesses a system memory by communicating directly with a pre-assigned register of a hardware device, the register having a predetermined physical address in the system, the product preferably comprising a computer-readable medium having computer-readable program instructions embodied therein, which instructions, when executed by the computer system, cause the system to protect addresses in the system memory from improper access by conveying a command from the application via the register to access the system memory and, responsive to the command, generating in the hardware device a command key corresponding to the physical address of the register, and by comparing the command key to a stored access key previously assigned to the application, so as to allow the application to access the system memory only if the keys match in a predetermined manner.

The present invention will be more fully understood from the following detailed description of the preferred embodiment thereof, taken together with the drawings, in which:

DETAILED DESCRIPTION OF A PREFERRED EMBODIMENT

Figure 3:
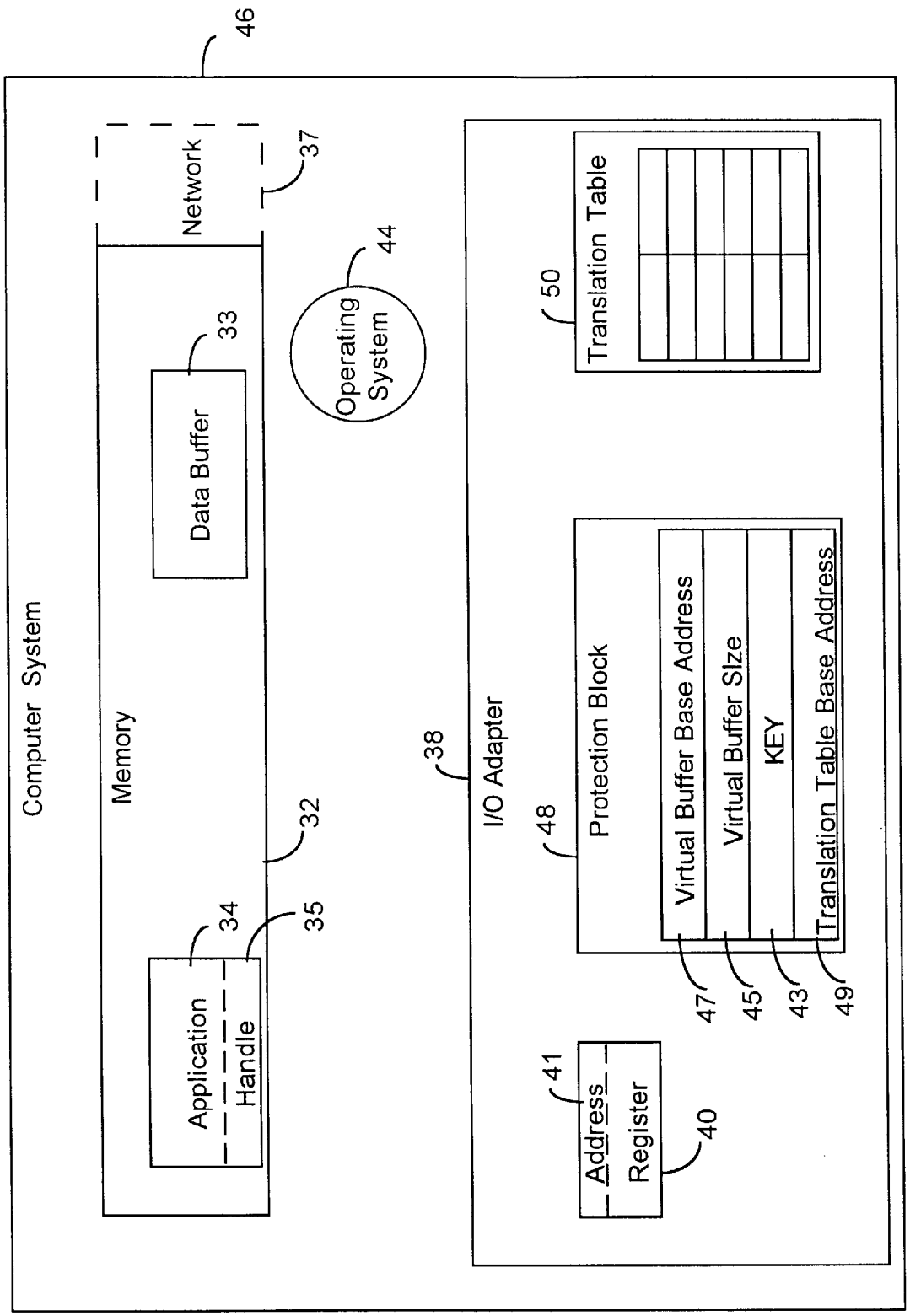
FIG. 3 is a schematic block diagram showing elements used and generated during implementation of an address protection scheme in a computer system, according to a preferred embodiment of the present invention.

FIG. 3 is a schematic block diagram showing elements used and generated in implementation of an address protection scheme operating in a computer system 46, according to a preferred embodiment of the present invention. An application 34 is stored in a system memory 32 of system 46, which memory typically also has other applications stored therein. System memory 32 is preferably implemented using industry-standard memory hardware devices, or any suitable combination of such devices. For example, memory 32 may comprise a combination of RAM integrated circuits and/or one or more devices which use a magnetic medium for memory storage, including both local memory and memory that is accessed via a computer network 37.

Figure 1:
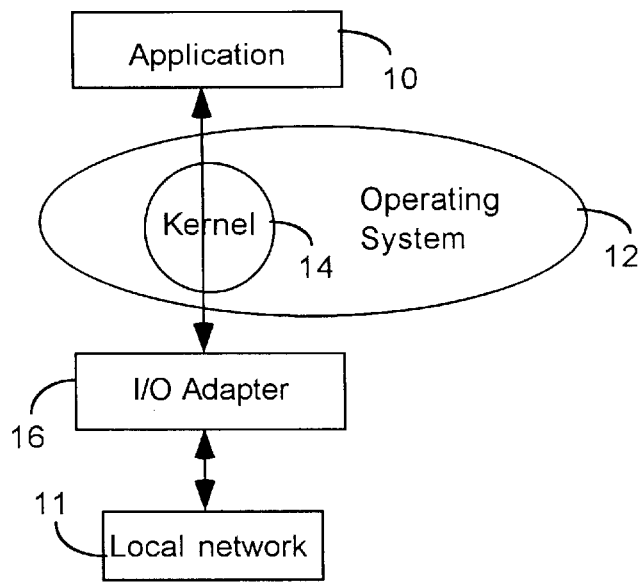
FIG. 1 is a schematic block diagram illustrating a conventional method of communication in a computing system, as is known in the art.
Figure 2:
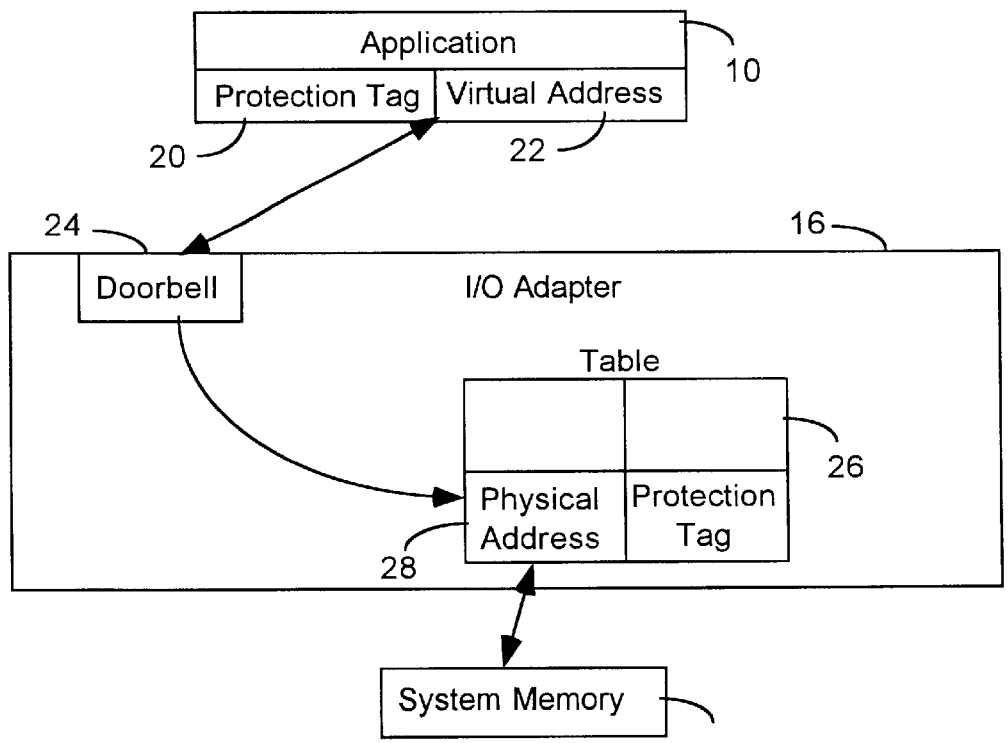
FIG. 2 is a schematic block diagram of a higher-speed computing system architecture, as is known in the art.

An I/O hardware adapter 38 is utilized by application 34, inter alia, in order to communicate with a data buffer 33 within memory 32, wherein data used by application 34 are stored. I/O adapter 38 is preferably implemented as a custom-designed integrated circuit chip, although any combination of custom or semi-custom or discrete devices may be used. Application 34 communicates with I/O adapter 38 via a dedicated register 40 on the adapter, which is functionally similar to doorbell 24 shown in FIG. 2. A software operating system 44 operating on computer 46 constrains application 34 and other applications running on the computer, so that only application 34 has permission to write to register 40. Application 34 uses virtual memory addresses during its operation, as are known in the art, which virtual addresses are translated by I/O adapter 38 into physical addresses of data buffer 33.

Figure 4:
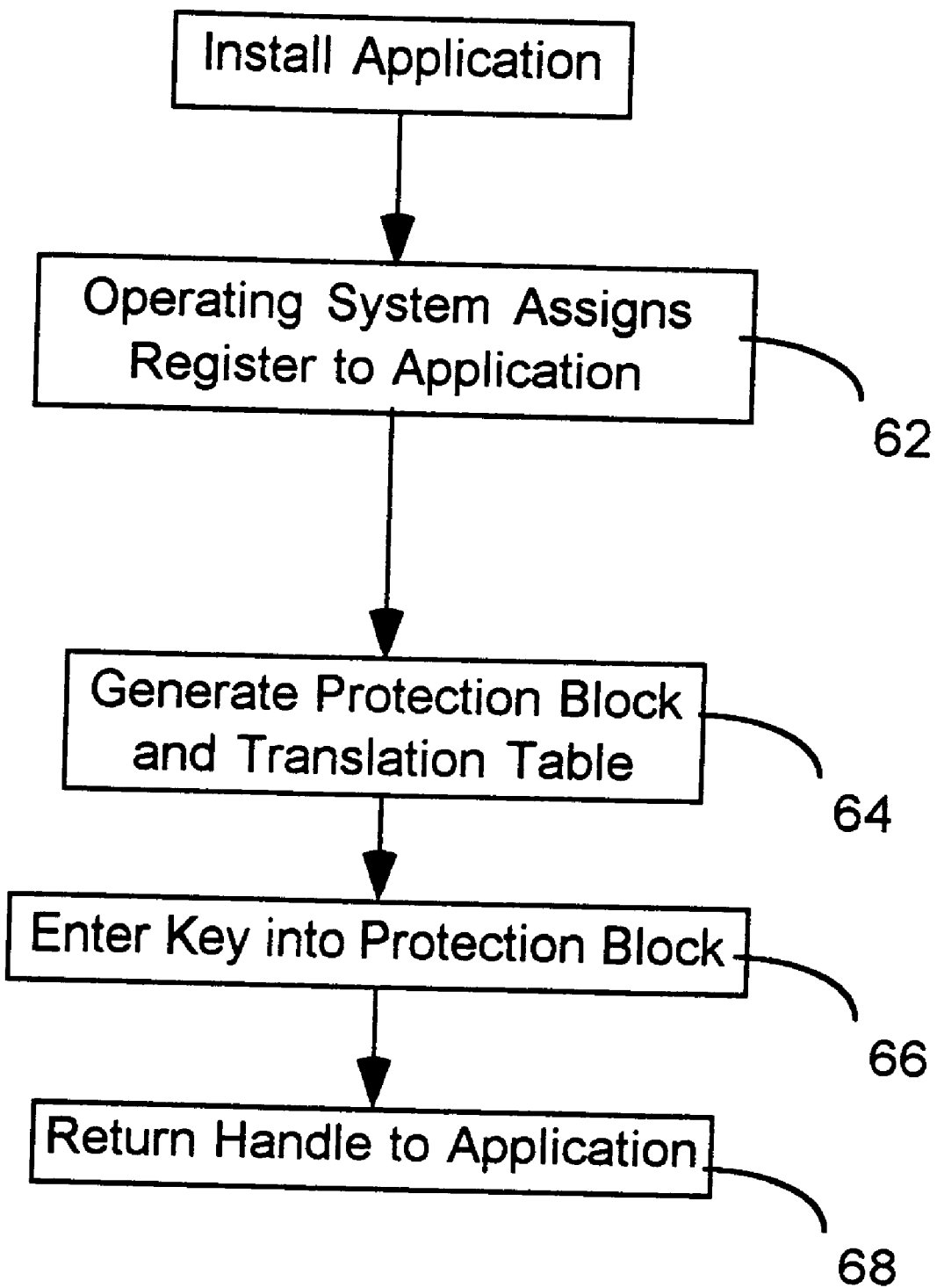
FIG. 4 is a flow chart illustrating steps in an initialization phase of the address protection scheme of FIG. 3, according to a preferred embodiment of the present invention.

FIG. 4 is a flow chart illustrating steps in an initialization phase of the address protection scheme, according to a preferred embodiment of the present invention. In the initialization phase, when application 34 is initially installed in memory 32, operating system 44 assigns register 40 to the application in a register assignment step 62. A protection block 48 and a translation table 50 for the application are generated in a memory of I/O adapter 38, in a block and table generation step 64. Protection block 48 holds data values referring to a virtual buffer in system memory 32 to be used by application 14. These data values preferably correspond to a base address 47 of the buffer and to a size 45 of the buffer. Optionally, the protection block may hold other access permissions for the virtual buffer apart from the base address and size, such as a read-only enable or a write-only enable, not shown in the figure.

Protection block 48 also holds a numerical key 43 whose value is a function of a physical address 41 of register 40, as shown in a key-entry step 66. The physical address is determined by the physical installation of I/O adapter 38 in computer 46. Thus, the numerical key is hardware-dependent and unique, since register 40 is assigned uniquely to application 34, and since register 40 has a unique hardware address. Register 40 serves the general purpose of doorbell 24 (FIG. 2), but in a novel and more advantageous manner than is known in the art.

Furthermore, protection block 48 holds a pointer 49 giving a base address of translation table 50. The table is used by I/O adapter 38 to translate virtual addresses used by application 34 into corresponding physical addresses in data buffer 33. At the end of the initialization phase, a numerical "handle" 35 is returned by the operating system to application 34 in a return-handle step 68, which handle is used in communications between the application and I/O adapter 38 as a pointer to the head of protection block 48.

Figure 5:
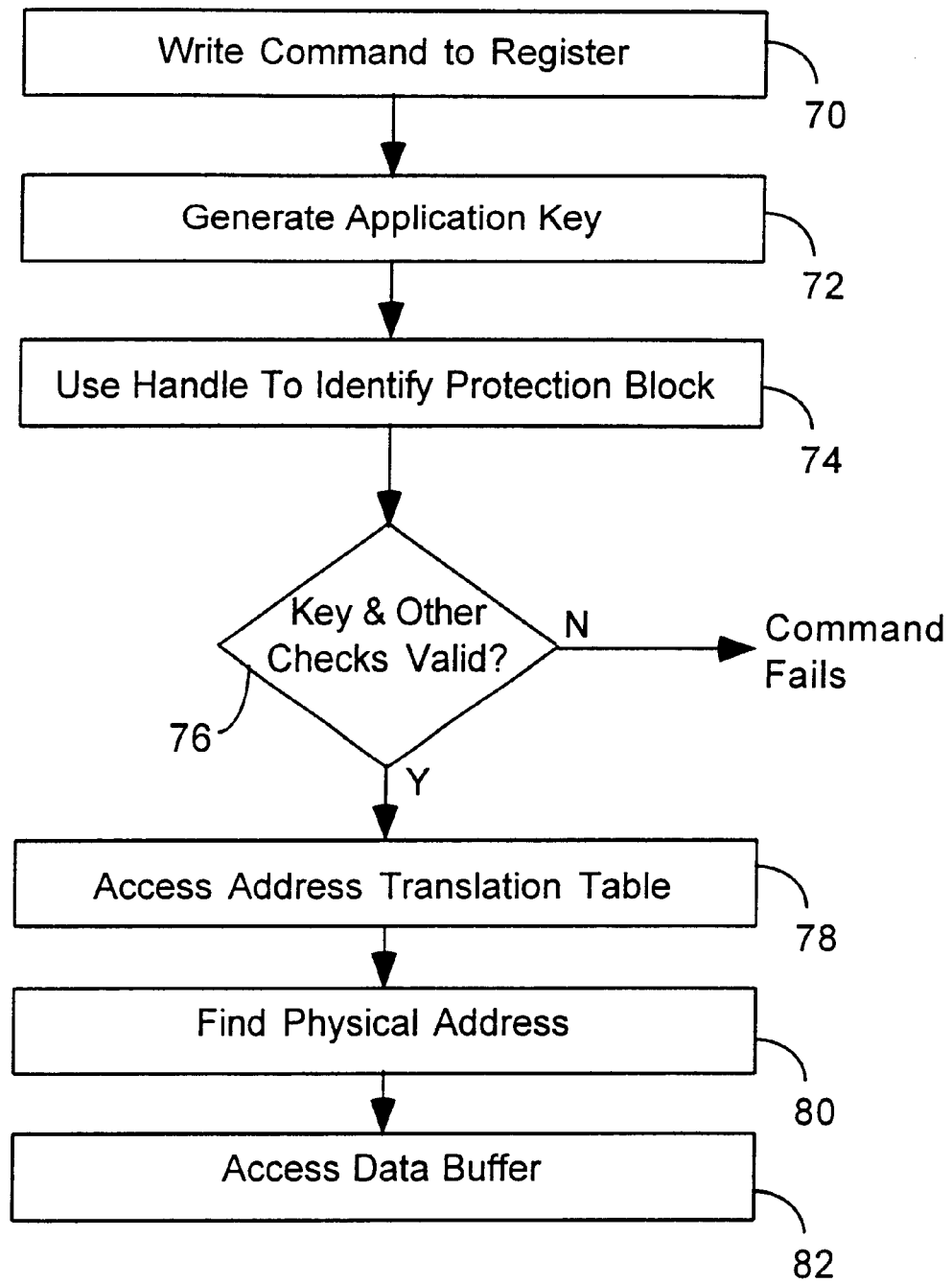
FIG. 5 is a flow chart illustrating steps in an operating phase of the address protection scheme of FIG. 3, according to a preferred embodiment of the present invention.

FIG. 5 is a flow chart illustrating steps in an operating phase of the address protection scheme, following the initialization phase of FIG. 4, according to a preferred embodiment of the present invention. In operation, application 34 writes a command to register 40, in order to access data buffer 33, in a write command step 70. Typically, the command is to write to or read from the buffer. The command syntax comprises a virtual address pointing to the data buffer, a length of the data to be written to or read from the buffer, and handle 35 that was received from the operating system by application 34 in the initialization stage, as described above with reference to FIG. 4. Because the command is written by application 34 to its specific register 40, the command is accepted by the register.

After receiving the command, I/O adapter 38 generates a hexadecimal application key in a key-generation step 72, corresponding to the physical address of the command, i.e., address 41 of register 40. Handle 35 of the command is used by the I/O adapter to identify protection block 28 in an identification step 74, and key 43 written into the protection block during the initialization stage is read. The generated application key and key 43 read from protection block 48 are compared in a comparison step 76, and if the keys match in a predetermined manner, preferably exactly, the command continues to execute. Further checks that are made at this stage are that the address range of the data is within acceptable limits, and that access properties embodied within the command agree with the optional access permissions. Providing all the above checks are passed, the command then uses the pointer in the protection block to access address translation table 50 at the table's base address in an access-table step 78. If all the checks are not passed, the command fails.

Address translation table 50 utilizes the virtual address pointer received from application 34 as an offset to the base address in order to find the appropriate entry in the translation table, in a find-address step 80. The selected entry in the translation table holds a physical address of data buffer 33 in system memory 32, and this physical address is used when the command executes at the data buffer, in an access-buffer step 82.

It will be appreciated that the key stored in the protection block during the initialization process, and the later key generated during operation of the application, are uniquely dependent on the physical address of register 40 in I/O adapter 38, i.e., on the physical address of a hardware element. Thus, unlike protection methods that use software-generated keys, there is no possibility that a conflict caused by more than one application accessing the same memory address can occur. Furthermore, some or all steps of the methods described hereinabove can be implemented using custom or semi-custom devices such as ASICs.

Alternatively or additionally, aspects of the methods described hereinabove may be implemented by suitable software running on computer system 46. This software may be distributed on tangible media, such as CD-ROM, for installation on system 46, or it may be distributed in electronic form, for example, via network 37.

It will be further appreciated that the preferred embodiment described above is cited by way of example. The full scope of the invention is limited only by the claims.

What is claimed is:

1. In a computer system in which a software application accesses a system memory by communicating directly with a hardware device, a method for protecting addresses in the system memory from improper access, comprising:
   in an initialization stage:
      assigning a register of the hardware device to the application;
      generating in the hardware device a protection block, which block is used thereafter by the device to control access by the application to the system memory;
      storing in the protection block a first key corresponding to a physical address of the register; and
      assigning a handle to the application that refers to the protection block; and
   in operation of the application:
      conveying a command from the application via the register to access the system memory, the command including the handle;
      responsive to the command, generating in the hardware device a second key corresponding to the physical address of the register;
      responsive to the handle, comparing the first and second keys; and
      allowing the application to access the system memory only if the first and second keys match in a predetermined manner.

2. A method according to claim 1, wherein the system memory comprises memory accessed via a computer network.

3. A method according to claim 1, wherein assigning the register comprises assigning the register uniquely to the application, among other applications and registers in the system.

4. A method according to claim 1, wherein storing the first key comprises storing a key unique to the system.

5. A method according to claim 1, wherein comparing the first and second keys comprises checking one or more access permissions held in the protection block.

6. A method according to claim 1, wherein allowing the application to access the system memory comprises utilizing a translation table associating virtual addresses used by the application with physical addresses in the system memory.

7. A method according to claim 6, wherein utilizing the translation table comprises storing a pointer to the translation table in the protection block.

8. A method according to claim 1, wherein allowing the application to access the system memory comprises allowing access only if the first and second keys match exactly.

9. In a computer system in which a software application accesses a system memory by communicating directly with a pre-assigned register of a hardware device, the register having a predetermined physical address in the system, a method for protecting addresses in the system memory from improper access, comprising:
   conveying a command from the application via the register to access the system memory;
   responsive to the command, generating in the hardware device a command key corresponding to the physical address of the register;
   comparing the command key to a stored access key previously assigned to the application; and
   allowing the application to access the system memory only if the keys match in a predetermined manner.

10. A method according to claim 9, wherein the access key is stored in a protection block of the hardware device, and wherein conveying the command comprises conveying a handle assigned to the application that refers to the protection block.

11. A method according to claim 9, wherein the stored access key corresponds to the physical address of the register.

12. A method according to claim 9, wherein the system memory comprises memory accessed via a computer network.

13. A method according to claim 9, wherein the pre-assigned register is assigned uniquely to the application, among other applications and registers in the system.

14. A method according to claim 9, wherein generating the command key comprises generating a key unique to the system.

15. A method according to claim 9, wherein comparing the command key and the stored access key comprises checking one or more access permissions held in the protection block.

16. A method according to claim 9, wherein allowing the application to access the system memory comprises utilizing a translation table associating virtual addresses used by the application with physical addresses in the system memory.

17. A method according to claim 16, wherein utilizing the translation table comprises storing a pointer to the translation table in the protection block.

18. A method according to claim 9, wherein allowing the application to access the system memory comprises allowing access only if the command and access keys match exactly.

19. An input/output adapter for communicating directly with a software application running in a computer system so as to enable the application to access a system memory while protecting addresses in the system memory from improper access, the adapter comprising:

a register having a physical address, which responsive to a command from the application to access the system memory generates a command key corresponding to the physical address of the register; and a protection block, which stores an access key assigned to the application, and which compares the command key and the access keys and enables the application to access the system memory only if the keys match in a predetermined manner.

20. An adapter according to claim 19, wherein the protection block comprises a handle which is used by the application to refer to the protection block.

21. An adapter according to claim 19, wherein the system memory comprises memory accessed via a computer network.

22. An adapter according to claim 19, wherein the register is assigned uniquely to the application, among other applications and registers in the system.

23. An adapter according to claim 19, wherein the command key comprises a key unique to the system.

24. An adapter according to claim 19, wherein the protection block holds one or more access permissions which are compared to enable the application to access the system memory.

25. An adapter according to claim 19, wherein the protection block accesses a translation table associating virtual addresses used by the application with physical addresses in the system memory.

26. An adapter according to claim 25, wherein the protection block stores a pointer to the translation table.

27. An adapter according to claim 19, wherein the application accesses the system memory only if the command and access keys match exactly.

28. A computer program product for use in a computer system so as to enable a software application to access a system memory by communicating directly with a hardware device while protecting addresses in the system memory from improper access, the product having computer-readable program instructions embodied therein, which instructions, when executed by the computer system, cause the system to assign a register of the hardware device to the application, and to generate in the hardware device a protection block, which block is used thereafter by the device to control access by the application to the system memory, and to store in the protection block a first key corresponding to a physical address of the register and assign a handle to the application that refers to the protection block, so that in operation of the application, when a command including the handle is conveyed from the application via the register to access the system memory, a second key is generated in the hardware device responsive to the command, corresponding to the physical address of the register, and wherein responsive to the handle, the first and second keys are compared, and the application is allowed to access the system memory only if the keys match in a predetermined manner.

29. A computer program product for use in a computer system in which a software application accesses a system memory by communicating directly with a pre-assigned register of a hardware device, the register having a predetermined physical address in the system, the product having computer-readable program instructions embodied therein, which instructions, when executed by the computer system, cause the system to protect addresses in the system memory from improper access by conveying a command from the application via the register to access the system memory and, responsive to the command, generating in the hardware device a command key corresponding to the physical address of the register, and by comparing the command key to a stored access key previously assigned to the application, so as to allow the application to access the system memory only if the keys match in a predetermined manner.

30. A computer program product for use in a computer system so as to enable a software application to access a system memory by communicating directly with a hardware device while protecting addresses in the system memory from improper access, the product comprising a computer-readable medium having computer-readable program instructions recorded therein, which instructions, when executed by the computer system, cause the system to assign a register of the hardware device to the application, and to generate in the hardware device a protection block, which block is used thereafter by the device to control access by the application to the system memory, and to store in the protection block a first key corresponding to a physical address of the register and assign a handle to the application that refers to the protection block, so that in operation of the application, when a command including the handle is conveyed from the application via the register to access the system memory, a second key is generated in the hardware device responsive to the command, corresponding to the physical address of the register, and wherein responsive to the handle, the first and second keys are compared, and the application is allowed to access the system memory only if the keys match in a predetermined manner.

* * * * *